United States Patent Office 3,704,110
Patented Nov. 28, 1972

3,704,110
ELECTRICALLY CONDUCTIVE SURFACE
John B. Finn, 6116 Applegate 43615, and Carl J. Hudecek, 2414 Pemberton Drive 43606, both of Toledo, Ohio
No Drawing. Continuation of abandoned application Ser. No. 849,236, July 24, 1969, which is a continuation of application Ser. No. 588,743, Oct. 24, 1966. This application May 13, 1971, Ser. No. 143,243
Int. Cl. C03b 29/00
U.S. Cl. 65—32     10 Claims

ABSTRACT OF THE DISCLOSURE

A glass substrate having a composition consisting essentially of 50–94 mole percent $SiO_2$, 1.5–35 mole percent $Cu_2O$, 0.5–30 mole percent $Al_2O_3$, 0–6 mole percent $Fe_2O_3$, 0 to 6 mole percent $AlF_3$, 0–6 mole percent NiO, 0–6 mole percent CoO and 0–11 mole percent $TiO_2$ and having an exposed electrically conductive surface of metallic copper developed from the $Cu_2O$ constituent in situ of said glass substrate by exposure of said glass substrate at elevated temperatures to successive oxidizing and reducing conditions.

---

This application is a continuation application of Ser. No. 849,236 filed July 24, 1969, now abandoned, which in turn is a continuation application of Ser. No. 588,743 filed Oct. 24, 1966, now abandoned, the disclosure of which are relied on.

The present invention relates generally to the field of electroconductive surfaces, and more particularly, to a vitreous glass article of manufacture having at least one electrically conductive exposed surface. Specifically, the instant invention relates to vitreous glass bodies capable of providing an exposed, adherent metallic electrically conductive surface.

It is generally known that glass does not have any appreciable electrical conductivity, at ambient temperatures. In recent years, the conventional attempts to increase the conductivity or reduce the resistivity of glass bodies generally involved the application of a conductive layer of a separate material onto the exterior surface of said glass. The conductive layer was usually applied by spraying or dipping the glass substrate into a solution containing a conductive agent. Other less conventional processes designed to reduce the resistivity of glass surfaces involved the multiple steps of cleaning the glass surface by sanding or acid etching followed by the immersion of the thus treated glass into a solution containing conductive reagents. The above procedures usually require at least two materials and often produced articles which exhibited non-uniformity, poor bonding and poor adherence of the conductive layer. Also, the deposited layer is prone to scratch and is easily poisoned by the presence of foreign, electrically resistant elements in the conductive spray or solution.

It will be appreciated by those skilled in the art that if glass articles of manufacture are effected with adherent conductive surfaces, the tendency to avoid the above-mentioned disadvantages would satisfactorily increase the usefulness of the conductive glass articles. Likewise, it will be further appreciated by those versed in the art that if glass articles possessing desirable conductive exposed surfaces are effected, by processes wherein said surfaces are developed from the glass itself in situ, said glass article would have a definite commercial value and would also represent a useful contribution to the art.

Accordingly, it is an object of this invention to provide an article of manufacture.

Another object of this invention is to provide a glass body having at least one exposed electrically conductive surface.

A further object of the present invention is to provide a glass article having a conductive electrically surface wherein said glass article inherently providing the conductive material for said conductive surface.

Still a further object of the present invention is to provide a glass article with an inherent low resistant exposed stable surfaces.

A still further object of the present invention is to provide a metallic, fixed layer on a glass substrate.

Yet a still further object of the invention is to provide a metallic surface that is free from the disadvantages associated with the prior art.

These and other objects, features and advantages of this invention will become self evident from the following detailed description of the mode and manner of practicing the invention.

In attaining the objects and features of this invention, it has now been surprisingly found that an inherent controlled conductive exposed surface can be produced by first selectively oxidizing and then selectively reducing the exposed surface of a vitreous copper-rich glass in situ.

The copper-rich glass, as employed herein, acts both as a metal source and as a vitreous substrate or base for the exposed conductive adherent layer. Generally, the copper glass will consist essentially of $SiO_2$, $Al_2O_3$, $Cu_2O$, $Fe_2O_3$, $AlF_3$, $TiO_2$ and $NiO_2$. The glasses employed for the purpose of the present invention are glass compositions containing copper and other glass forming components such as silicon dioxide ($SiO_2$), aluminum oxide ($Al_2O_3$), ferric oxide ($Fe_2O_3$), nickel oxide (NiO), cobalt oxide (CoO) and aluminum trifluoride ($AlF_3$). The subject glasses consist essentially of 50 to 94 mole percent $SiO_2$, 0.5 to 30 mole percent $Al_2O_3$, and 1.5 to 35 mole percent $Cu_2O$; a glass having a theoretical composition consisting essentially of 50 to 94 mole percent $SiO_2$, 0.5 to 30 mol percent $Al_2O_3$, 1.5 to 35 mole percent $Cu_2O$, 0 to 11 mole percent $TiO_2$, 0 to 6 mole percent $Fe_2O_3$, 0 to 6 mole percent NiO, 0 to 6 mole percent CoO and 0 to 6 mole percent $AlF_3$; a glass composition with a theoretical composition consisting essentially of 58 to 83 mole percent $SiO_2$, 4 to 20 mole percent $Al_2O_3$, 10 to 20 mole percent $Cu_2O$, 0 to 11 mole percent $TiO_2$, 0 to 6 mole percent $Fe_2O_3$, 0 to 6 mole percent NiO, 0 to 6 mole percent CoO and 0 to 6 mole percent $AlF_3$; and a glass containing 58 to 83 mole percent $SiO_2$, 4 to 20 mole percent $Al_2O_3$, 10 to 15 mole percent $Cu_2O$, and a member selected from the group consisting of $TiO_2$, CoO, NiO, $Fe_2O_3$ and $AlF_3$ and mixtures thereof; and a glass composition with a theoretical composition consisting of 74.5 to 88 mole percent $SiO_2$, 2.5 to 10 mole percent $Al_2O_3$, 7.5 to 12.5 mole percent $Cu_2O$ and at least one of 1 to 6 mole percent $TiO_2$, $Fe_2O_3$, NiO, $AlF_3$ or CoO.

The glasses employed herein can be prepared by intimately blending the necessary batch constituents, melting and heating to such temperature so that all glass forming ingredients are present in a liquid state to enable the formation of a glass from a homogenous melt. The glasses are usually prepared by mixing and then melting in a 90% platinum–10% rhodium crucible or a fused silica crucible. The size of the melt was usually between 2000 grams and 5500 grams or larger, and the melting temperature was about 1500° C. to 1600° C., for 20 to 30 hours. The melting was carried out in an electric heated furnace, although, other equivalent heating means could be successfully employed. The glasses were usually prepared under a slight oxygen atmosphere.

The glasses used herein were prepared from commercially available reagents, for example, Kona Quintus Quartz, Alcoa A–14 Alumina, CuO, $Cu_2O$, $TiO_2$, NiO, $Fe_2O_3$, $AlF_3$, Hi-Calumet Cupric and the like.

Exemplary of a glass used for the purpose of the present invention is a glass characterized by a theoretical composition consisting essentially of 77.5 mole percent $SiO_2$, 10.0 mole percent $Al_2O_3$ and 12.5 mole percent $Cu_2O$, with an annealing point of 629° C., and unannealed density of 2.732 and a thermal coefficient of expansion of $3.2 \times 10^{-7}$/C. (0.300° C.). The immediate glass was prepared by intimately mixing 3745 grams of Kona Quintus Quartz, 822.8 grams of A–14 Alumina and 1493 grams of 96.3% cuprous oxide, and melting the mixed batch in a fused silica crucible at 2950° F., for about 24 hours under a 0.5% oxygen atmosphere. Other glass compositions were prepared as follows: a glass was prepared by melting a batch containing 3193 grams of Kona Quintus Quartz, 700 grams of A–14 Alumina, 1018 grams of $Cu_2O$ and 130.2 grams of NiO, for 24 hours and 40 minutes at 2950° F., to effect a glass having a theoretical composition of 77.5 mole percent $SiO_2$, 10.0 mole percent $Al_2O_3$, 10.0 mole percent $Cu_2O$ and 2.5 mole percent NiO; a glass prepared by intimately blending and melting, at 2920° F. for 24 hours and 30 minutes, a batch containing 3121 grams of Kona Quintus Quartz, 686 grams of A–14 Alumina and 1330 grams of Hi-Cupric Calumet to give a glass with the theoretical composition of 77.5 mole percent $SiO_2$, 10.0 mole percent $Al_2O_3$, and 12.5 mole percent $Cu_2O$, which glass had an unannealed density of 2.7020, an annealing point of 601° C., and a coefficient of expansion of $4.1 \times 10^{-7}$/C. (0–300° C.); a glass consisting essentially of 75.0 mole percent $SiO_2$, 10.0 mole percent $Al_2O_3$, 12.5 mole percent $Cu_2O$ and 2.5 mole percent $Fe_2O_3$, was prepared from a batch containing 2922 grams of Kona Quintus Quartz, 622 grams of A–14 Alumina, 1204 grams of of cuprous oxide and 259.6 grams of $Fe_2O_3$, by melting said batch for 24 hours in a 0.5% oxygen atmosphere; a glass composition consisting of 73 mole percent $SiO_2$, 12.5 mole percent $Al_2O_3$, 12.5 mole percent $Cu_2O$ and 2.0 mole percent $TiO_2$ was prepared by intimately blending and then melting at 2950° F. for 24 hours in a 0.5% oxygen atmosphere a batch containing 2883 grams of Kona Quintus Quartz, 840 grams of A–14 Alumina, 1220 grams of $Cu_2O$ and 106 grams of Titanox ($TiO_2$); and a glass consisting of 77 mole percent $SiO_2$, 9.25 percent $Al_2O_3$, 12.4 mole percent and 1.3 mole percent aluminum fluoride prepared from 3119 grams of Kona Quintus Quartz, 589 grams of A–14 alumina, 1329 grams of Hi-Calumet Cupric and 74 grams of aluminum fluoride. Other glasses, as well as the preparation utility and discussion of said glasses, are set forth in abandoned application U.S. Ser. No. 465,381 and in application U.S. Ser No. 552,992, now abandoned.

An electrical conductive surface was produced on the above vitreous glass composition by first exposing the glass to an oxidizing air atmosphere over a temperature range of 500° F. to 1200° F. for about 6 to 15 minutes. Generally, an adherent copper metallic surface layer was obtained by first oxidizing for, example, in air at 700 to 750° F. for 10 to 12 minutes usually at 725 to 750° F. for 10 minutes, then reducing in hydrogen at 600° to 1000° for 6 to 60 minutes, usually at 725° F. to 750° F. for 10 minutes. The reduced samples were usually cooled at a rate of 5 to 15° F. per minute in a reducing atmosphere, for example, hydrogen, to about 200° F. before the samples were removed from the reducing oven atmosphere.

Representative of the oxidizing agents that can be employed for fabricating the novel articles of manufacture of the subject invention are air, a forced moving air atmosphere, oxygen, and air atmosphere enriched with oxygen, mixtures or combinations of air or oxygen with nitrogen or inert gases such as argon, neon etc., ozone, and other functionally equivalent oxidizing reactive agents. Illustrative of the reducing agents that can be utilized for effecting the product of the instant invention are nascent hydrogen, carbon monoxide, mixtures of carbon monoxide and hydrogen and other functionally equivalent reducing agents. Exemplary of the presently now preferred oxidizing and reducing agents are air, forced moving air, oxygen and hydrogen.

An adherent, stable copper surface layer exemplary of the spirit of the present invention, was produced on a vitreous glass consisting of 77.5 mole percent $SiO_2$, 10.0 mole percent $Al_2O_3$ and 12.5 mole percent $Cu_2O$ by first oxidizing a piece of glass for 10 minutes, at 750° F. in air, then placing the oxidized glass in a hot furnace at 675° F. for 10 minutes with hydrogen flowing continuously. At thhe end of 10 minutes, the furnace was turned off and allowed to cool to 200° F. before the glass was removed. Four samples of glass of the above composition were prepared in the present manner to produce an adherent metallic surface exhibiting a resistance of 0.6, 0.9, 1.7 and 1.4 ohms per square. Other glass compositions similar to the above described glass compositions were oxidized and reduced according to the novel method of the subject invention except that at least one surface of the glass was first ground with a slurry of a silicon carbide to a 120 grit ground surface and then the ground glass surface was treated as described hereinbefore.

The surface resistance, expressed as ohms per square, was measured for other glass compositions that were first surface oxidized and then surface reduced according to the procedure set forth above. The surface resistance for these various glass compositions was as follows: Four samples of a vitreous glass consiting of 71.6 mole percent $SiO_2$, 13.0 mole percent $Al_2O_3$ and 15.4 mole percent $Cu_2O$ had a surface resistance of 0.7, 0.3, 0.5 and 0.3; a vitreous glass consisting of 75.0 mole percent $SiO_2$, 10 mole percent $Al_2O_3$, 12.5 mole percent $Cu_2O$ and 2.5 mole percent $Fe_2O_3$ exhibited a surface resistance of 0.5, 0.6, 0.3 and 0.8 ohm per square; and a vitreous glass consisting of 73 mole percent $SiO_2$, 12.5 mole percent $Al_2O_3$, 12.5 mole percent $Cu_2O$ and 2.0 mole percent $TiO_2$ had a surface resistance for four treated samples of 2.7, 2.2, 5,2 and 2.2 ohms per square.

Surface resistance measurements were made on untreated glass samples wherein the glass consists of 77.5 mole percent $SiO_2$, 10.0 mole percent $Al_2O_3$ and 12.5 mole percent $Cu_2O$ and the results were $10^9$ ohms per square. The surface resistivity was also measured on an oxidized sample of glass of the above composition, which sample was oxidized at 700° F. for 10 minutes in an air atmosphere. This oxidized glass had a surface resistivity of $10^9$ ohms per square. The surface resistance for two like samples of glass of the above composition that were both oxidized and reduced, with the oxidization effected at 700° F. for 15 minutes for one sample and at 750° F. for 10 minutes for the second sample and then reducing both samples at 1000° F. for 10 minutes under a hydrogen atmosphere was 0.6 and 0.4 ohm per square respectively. A like sample of glass that was reduced at 1000° F. for 10 minutes but not oxidized exhibited a resistivity of 5 ohms per square.

Glass samples prepared by the above described oxidation and reduction techniques were further tested by standard evaluation tests to demonstrate the unexpected results of the present invention. The tests conducted on untreated glass, oxidized glass, reduced glass were the standard adhesion and scratch tests.

The adhesion test was conducted by hand pressing commercial electricians tape to the various surface of glasses and then observing the amount of copper coating which adheres to the tape. This test indicates the adhesion of the metallic copper to the base glass. The results for the adhesion test were expressed as fair, good or excellent adhesion. The adhesion test was conducted on various glass compositions, such as, a glass consisting essentially of 77.5 mole percent $SiO_2$, 10 mole percent $Al_2O_3$ and 12.5 mole percent $Cu_2O$. When the present sample was reduced only, the adhesion test indicated good adhesion. If the sample was both oxidized and reduced the adhesion of the metallic layer onto the glass substrate was excellent. An oxidized but non-reduced sample demonstrated excellent adherent properties for the metallic film.

The glasses were also subject to a scratch test which test consist of running or scratching a nail across the surface of untreated and treated glasses to indicate the glass scratch resistance. The scratch resistance for a reduced but unoxidized glass was a fair anti-scratch property. A both reduced and oxidized treated glass demonstrated excellent scratch resistance. A sample that was oxidized also exhibited excellent anti-scratch properties.

The surface resistance of the above glasses was usually measured with a standard, commercially available ohm meter. Silver contact points were usually applied to opposite ends of a surface of the glass sample, after the oxidation step to assist and insure surface resistance measurement. The silver contact points were applied by easily coating a small surface area with a commercially available commercial silver paint. The surface resistance as reported herein is expressed in ohms per square, and is based upon equal areas of measurement for each sample in order to account for variations in the sample size and therefore, provides a valid standard basis for measuring and for comparison.

The novel articles of the present invention can be used in the fields of commerce and science. For example, the applications include printed circuits on glass substrates, capacitors by reducing two surfaces of a thin copper glass sheet, sealing the glass to quartz or glass-ceramics with subsequent reduction followed by copper plating to obtain a thermal conductive surface and the like applications.

Obviously, many modifications and variations of the instant invention are possible in the light of the above teachings, and, it is therefore to be understood that within the scope of the disclosure and claims, the invention may be practiced otherwise than as specifically described.

What is claimed is:

1. A method for producing an electrically conductive exposed copper surface on at least one surface of a solid shaped vitreous, amorphous, non-crystalline glass article consisting essentially of the steps of forming a shaped vitreous, amorphous copper containing glass article from a melt of a homogeneous glass composed essentially of, expressed on an oxide basis; 50 to 94 mole percent $SiO_2$, 1.5 to 35 mole percent $Cu_2O$, 0.5 to 30 mole percent $Al_2O_3$, 0 to 6 mole percent $Fe_2O_3$, 0 to 6 mole percent CoO, 0 to 6 mole percent NiO, O to 6 mole percent $AlF_3$ and 0 to 11 mole percent $TiO_2$, said copper containing glass functioning as the source of the copper metal and as the substrate for the conductive layer, oxidizing at least one surface of said shaped vitreous glass article by exposing same to an oxidizing atmosphere at a temperature of 700° to 750° F. for 6 to 15 minutes, said article remaining in the glassy state, thereafter exposing the resulting oxidized surface to a reducing atmosphere at a temperature of 600° to 1000° F. for 6 to 60 minutes, the shaped article remaining in the glassy state, and forming in situ an integral electrically conductive copper surface on said shaped, vitreous, amorphous, non-crystalline, glass article.

2. A method as defined in claim 1, wherein said vitreous glass substrate consists essentialy of 58 to 83 mole percent $SiO_2$, 4 to 20 mole percent $Al_2O_3$, 10 to 20 mole percent $Cu_2O$ and 0 to 6 mole percent $Fe_2O_3$.

3. A method as defined in claim 1 wherein said vitreous glass substrate consists essentially of 58 to 83 mole percent $SiO_2$, 4 to 20 mole percent $Al_2O_3$, 10 to 20 mole percent $Cu_2O$ and 1 to 6 mole percent $TiO_2$.

4. A method as defined in claim 1 wherein said vitreous glass substrate consists essentially of 58 to 83 mole percent $SiO_2$, 4 to 20 mole percent $Al_2O_3$, 10 to 20 mole percent $Cu_2O$ and 1 to 6 mole percent NiO.

5. A method as defined in claim 1 wherein said vitreous glass substrate consists essentially of 71.6 mole percent $SiO_2$, 13 mole percent $Al_2O_3$ and 15.4 mole percent $Cu_2O$.

6. A method as defined in claim 1 wherein said vitreous glass substrate consists essentially of 77.5 mole percent $SiO_2$, 10 mole percent $Al_2O_3$ and 12.5 mole percent $Cu_2O$.

7. A method as defined in claim 1 wherein said vitreous glass substrate consists essentially of 77 mole percent $SiO_2$, 9.25 mole percent $Al_2O_3$, 12.5 mole percent $Cu_2O$ and 1.3 mole percent $AlF_3$.

8. A method as defined in claim 1 wherein said vitreous glass substrate consists essentialy of 73 mole percent $SiO_2$, 12.5 mole percent $Al_2O_3$, 12.5 mole percent $Cu_2O$ and 2.0 mole percent $TiO_2$.

9. A method as defined in claim 1 wherein said vitreous glass substrate consists essentially of 77.5 mole percent $SiO_2$, 10 mole percent $Al_2O_3$, 10 mole percent $Cu_2O$ and 2.5 mole percent NiO.

10. An article of manufacture made by the method as defined in claim 1.

References Cited

UNITED STATES PATENTS

| | | | |
|---|---|---|---|
| 3,231,456 | 1/1966 | McMillan et al. | 65—32 |
| 3,346,357 | 10/1967 | Baak | 65—33 |
| 3,464,806 | 9/1969 | Seki et al. | 65—33 X |
| 3,420,645 | 1/1969 | Hair | 65—22 X |
| 3,490,887 | 1/1970 | Herczog et al. | 65—33 |

FOREIGN PATENTS

| | | |
|---|---|---|
| 41/5104 | 3/1966 | Japan. |

FRANK W. MIGA, Primary Examiner

U.S. Cl. X.R.

65—33, 134

UNITED STATES PATENT AND TRADEMARK OFFICE
CERTIFICATE OF CORRECTION

PATENT NO. : 3,704,110

DATED : November 28, 1972

INVENTOR(S) : J. B. Finn and C. J. Hudecek

It is certified that error appears in the above-identified patent and that said Letters Patent are hereby corrected as shown below:

Col. 1, line 5, Assignee should be listed as --Owens-Illinois, Inc.--. Col. 2, line 39, "mol" should be--mole--. Col. 3, line 52, after "Ser" insert a period --(.)--. Col. 4, line 14, "thhe" should be --the--; line 32, "consiting" should be --consisting--. Col. 6, line 10, "essentialy" should be --essentially--.

*Signed and Sealed this*

Seventeenth *Day of* May 1977

[SEAL]

*Attest:*

RUTH C. MASON
*Attesting Officer*

C. MARSHALL DANN
*Commissioner of Patents and Trademarks*